Sept. 8, 1931.  E. B. MILLER  1,822,303
REVIVIFYING ADSORBENT MATERIALS
Filed June 7, 1922   3 Sheets-Sheet 1

Inventor
E. B. Miller,
By Watson, Coit, Morse & Grindle,
Attorney

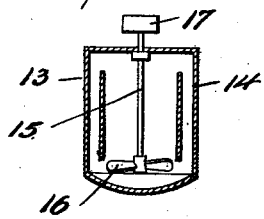
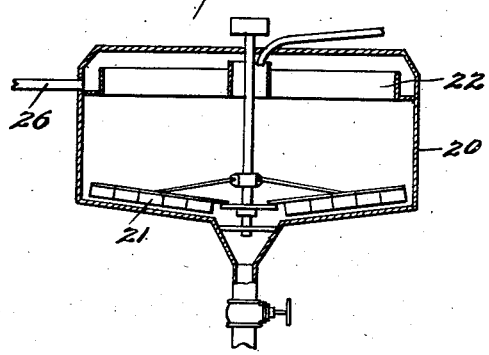
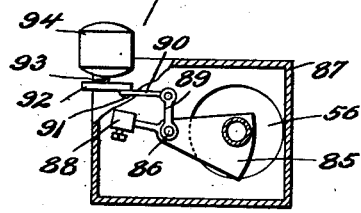

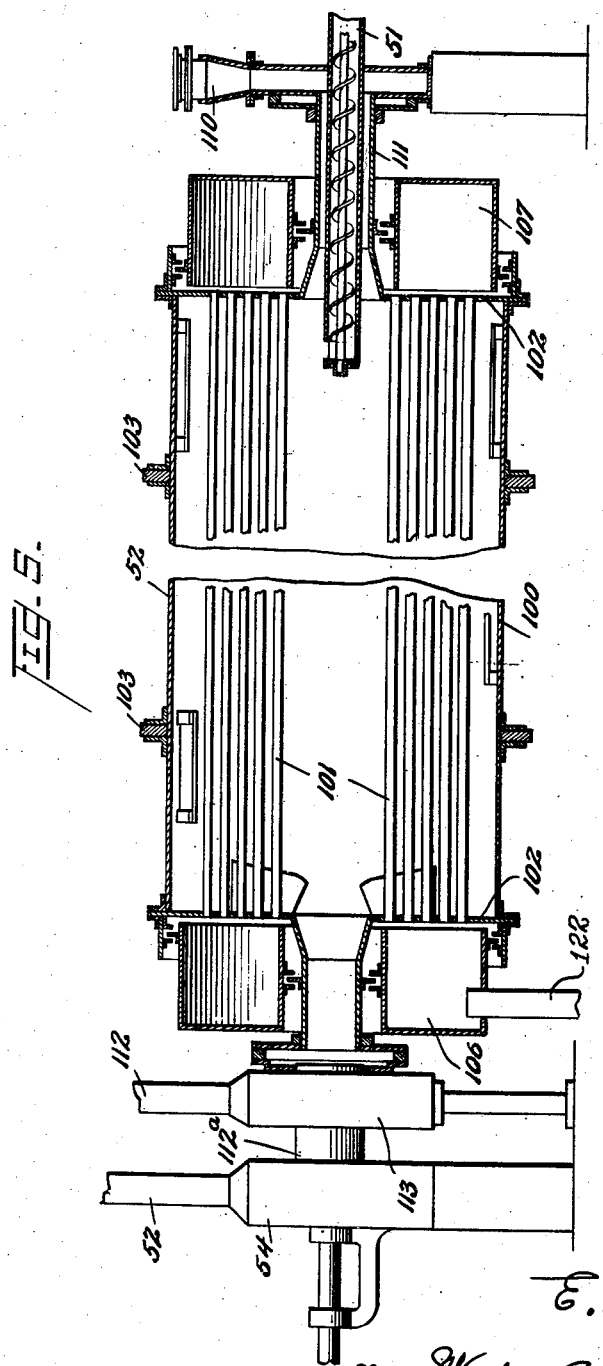

Patented Sept. 8, 1931

1,822,303

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

REVIVIFYING ADSORBENT MATERIALS

Application filed June 7, 1922. Serial No. 566,664.

The present invention relates to a method of revivifying or reactivating adsorbent materials, and more particularly to adsorbent materials which have been used in the treating of liquids to remove or recover substances therefrom.

Briefly stated, the method comprises indirectly heating the material in the presence of a non-oxidizing carrier gas, and then treating the material with an oxidizing gas such as air to remove impurities therefrom and thereby convert it into a form suitable for reuse as an adsorbent.

The objects and features of novelty of the invention will be apparent from the description taken in connection with the drawings, in which:

Fig. 2 is a sectional elevation of one form of agitator that may be employed in the apparatus;

Fig. 3 is a sectional elevation of one form of separator that may be used in the apparatus;

Fig. 4 is a sectional plan view taken substantially on the line 4—4 of Figure 1, showing a feed device; and Fig. 5 is a longitudinal sectional elevation through one form of activator that may be employed.

Figure 1:
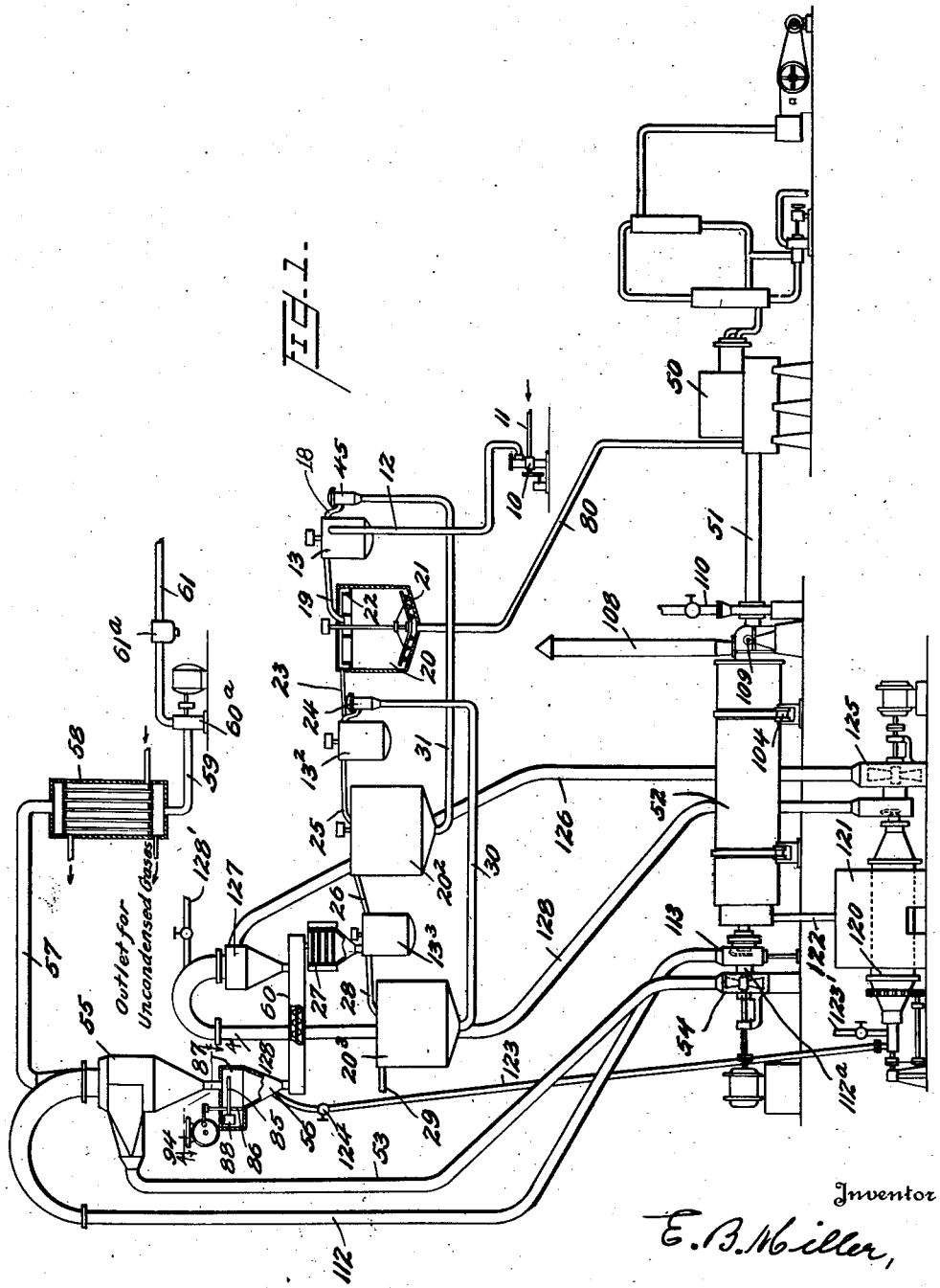
Fig. 1 is a diagrammatic view illustrating in elevation one form of apparatus for treating liquids in accordance with the present method.

The material preferably employed in the method for removing impurities is silica gel. This is a glass-hard material having ultra microscopic pores and may be heated as high as 700° C. without injury. In cases where silica gel is not suitable, other hard porous gels or adsorbing materials may be used, provided they have a sufficient number of small pores as defined above, i. e., activated charcoal, gels of iron oxide, tin oxide, aluminum oxide, tungsten oxide, zirconium oxide and titanium oxide.

According to the present invention, the petroleum product is refined by bringing the crude product into intimate contact with an adsorbing material having pores of a size to adsorb the matter in solution, the material preferably being in powdered condition, and thereafter separating the refined products from the material. It is also desired to liberate and in many instances recover the adsorbed impurities from the adsorbing material, such as silica gel so that the material may be used over again. In the present method the material is activated by driving the adsorbed substances directly from the pores of the material as by a non-oxidizing gas such as steam, carbon dioxide, nitrogen, etc., heated to the desired temperature by radiation or indirect heat, and then heating the material in the presence of a gaseous medium to convert it into a form suitable for reuse in the adsorption cycle.

For the purpose of adsorbing the impurities and matters in solution from the petroleum product to be refined, any one of several methods may be used. For example, the the crude liquid may be made to percolate through a tower filled with a porous adsorbing material, such as silica gel, and the refined product drawn off at the bottom of the tower. After the gel has become saturated with the impurities being removed from the liquid, the crude is diverted to a second similar tower, while the gel in the first tower is reactivated by suitable means.

In practice, however, it is preferred to use a different method. The preferred method consists in causing a stream of crude liquid to enter at one end and to flow through a series of devices wherein the liquid and adsorbing material are successively brought into intimate contact and then separated, the material moving in one direction through said devices and the liquid flowing in the opposite direction. In the present instance the liquid enters at one end and flows by gravity successively through a series of agitators and separators, containing a proper porous adsorbing material, such as silica gel, which is fed in continuously at the end opposite to that at which the liquid enters and by appropriate means made to move in the direction counter-current to the liquid flow. In this way a part of the objectionable constituents of the liquid being refined is removed at each stage, as the liquid flows through the agitators until finally the refining is completed in the last agitator where the liquid, which has already had most of the impurities removed, comes in contact with freshly activated adsorbing material.

According to the present invention, after the adsorbing material has been separated from the liquid being refined, it is immediately subjected to activation without the step of the liquid wash. In this step of activation the substances adsorbed from the liquid being refined, in the pores of the adsorbing material, are liberated by subjecting the material to a non-oxidizing hot gas such as steam at moderate temperatures, carbon dioxide, nitrogen, etc. whereby the adsorbed substances are distilled or driven out of the pores of the adsorbing material. One form of apparatus for carrying out this method will now be described.

Referring to the drawings, the liquid to be refined, such as a petroleum product, is supplied to a pump 10 by a pipe 11 and this pump through the pipe 12 feeds the petroleum into an agitator 13. This agitator may be of any suitable construction. As shown in Figure 2, it may consist of a closed vessel 14 having a vertical shaft 15 provided with blades 16, said shaft projecting above the top of the vessel and having a pulley 17 whereby the shaft is rotated. Suitable finely divided absorbing material, such as the silica gel previously mentioned, is supplied through the pipe 18 to the agitator so that the petroleum product and gel are thoroughly mixed. The mixture is continuously discharged through the pipe 19 to a separator 20. As shown in Figure 2, this separator the function of which is to separate the adsorbing material from the liquid consists of a closed top vessel having a slightly conical bottom provided with an outlet. A shaft is disposed vertically in the vessel and adjacent the bottom thereof has the deflectors 21 for forcing the adsorbing material, which settles at the bottom, toward the outlet. Around the top of the vessel is a launder 22. The adsorbing material settles to the bottom of the tank and is discharged through the outlet, while the petroleum product flows into the launder and is carried by a pipe 23 to an agitator $13^2$ and a pump 24 acts to continuously supply adsorbing material to said agitator $13^2$. The mixture is discharged from this second agitator through a pipe 25 to a second separator $20^2$. In the same manner as previously described, the adsorbing material settles to the bottom of this separator and the petroleum is discharged through a pipe 26 into a third agitator $13^3$. This agitator is supplied with freshly activated adsorbing material from a hopper 27. The mixture from the agitator is conveyed by the pipe 28 to a third separator $20^3$. The refined petroleum is discharged from this separator through a pipe 29. The adsorbing material which settles to the bottom of the third separator is discharged through the outlet in the bottom and conveyed by the pipe 30 to the pump 24, previously mentioned, this pump acting to cause the flow of the adsorbing material. The adsorbing material discharged at the bottom of the second or middle separator is conveyed by a pipe 31 to a pump 45 which discharges into the pipe 18 previously mentioned. This pump 45 effects the flow in the pipe 31.

Although an apparatus having three units, each unit consisting of an agitator and a separator has been described, the invention is not limited to any particular number of units.

It will be noted that the fresh, or activated gel is fed into the system to act on the product being refined just before it is finally discharged and then its path through the apparatus is from the discharge end toward the inlet end. Thus, the product fed into the first agitator 13 is mixed with adsorbing material that has already passed through a plurality of separators. This counter-flow of the adsorbing material and the petroleum product to be refined gives a very efficient action.

The adsorbing material settling in the bottom of the first separator 20 is discharged into a pipe 80. This adsorbing material has adsorbed impurities from the petroleum product and, of course, has petroleum product associated therewith. In order to make the process continuous, it is now necessary to free the adsorbing material from its adsorbed substances or "activate" it. The pipe 80 carries the saturated adsorbed material to a filter press 50 of any suitable construction. In this press the surface liquid is filtered out and the gel cake discharged through the pipe 51 to an activator 52. This activator is illustrated in Figure 5. Briefly stated, it comprises a cylindrical shell 100 with tubes 101 connecting the opposite heads 102. The shell is provided with circumferential rings 103 supported by rolls 104 (Figure 1) whereby the cylinder as a whole may be rotated. Hot gases are supplied through the pipe 122 which has communication with the chamber 106. This chamber in turn is in communication with the interior of the tubes 101 so that the hot gases pass through the tubes to the chamber 107 at the opposite end of the cylinder. This chamber is in communication with a suction fan 109 (Figure 1) having the outlet pipe 108. The adsorbing material to be activated is supplied through the conduit 51 to the interior of the cylinder but exteriorly of the tubes 101. For liquids, which the present method is adapted to refine, it is desirable to prevent the ingress of air to the interior of the activator where it would mix with the adsorbing material, for the reason that if heat as furnished by said hot gases alone is employed for activating the adsorbing material there is danger of the air oxidizing the substances adsorbed in the pores of the material with the deposition of carbonaceous and gummy materials which would clog the pores. Furthermore, where air is admitted to the activator, there is danger of explosion due to the oxidizing of the volatile liquid associated or given off from the adsorbing material. Neither of these disadvantages occurs where air is excluded from the activator.

It is one of the principal objects of the present invention, therefore, to activate the adsorbing material by driving out the substances adsorbed in its pores by means of a non-oxidizing hot gas such as carbon dioxide, steam at moderate temperatures, nitrogen, etc. For this purpose an inlet 110 is provided so that steam for example may be supplied to the interior of the activator. Of course, the hot gases supplied from the furnace 121 aid in keeping the activator at a relatively high temperature and prevent condensation of the steam within the same. The activated adsorbing material is discharged through the conduit 112ª into the inlet of the fan 54, which acts as a booster to increase the carrying power of the gas admitted at inlet 110, the current of the gas having already served to move the adsorbent through the activator. The pipe 53 from the fan discharges the adsorbing material or gel into a cyclone or continuous separator 55 wherein the gel settles to the bottom and is discharged into a hopper 56, from which it is fed by a screw conveyor 60 to the hopper 27, which discharges into agitator 13³ thereby returning the gel into the refining cycle. If desired the gel may be cooled and for this purpose the hopper 27 has its upper portion constructed with cooling surfaces. The vapors may be discharged from the cyclone separator 55 directly into the atmosphere, or, if it is desired to recover any of the vapors they pass through a pipe 57 to the condenser 58. The condensate and gel not separated by the cyclone 55 are drained through a pipe 59 to a pump 60ª which discharges to a separator (not shown) for the purpose of separating water from oil if the apparatus is used to refine an oil. The oil thus recovered may be further refined or used for fuel or other purposes. A filter 61ª may be provided in pipe 61 to catch any of the adsorbing material if it should travel to this point.

It is desirable to prevent any passage of vapors at the lower end of the cyclone separator 55. In the present instance, for this purpose a novel form of feeding device is employed. As shown in Figure 4, this comprises a plate 85 carried by an oscillating shaft 86 disposed in a box 87, having a hopper bottom 56. The plate 85 is disposed horizontally and is counterbalanced by the weight 88. As shown in Figure 1, the plate is disposed a slight distance below the lower end of the outlet of the cyclone separator 55. The plate is oscillated back and forth in a horizontal plane in any suitable manner but the extent of oscillation is not sufficient to open up the lower end of the cyclone at any time. For the purpose of oscillating the shaft 86 any suitable mechanism may be employed. As shown, an arm 89 is secured to the upper end of the shaft and outside the box 37. This arm is connected by a link 90 to a crank pin 91 on the crank disk 92, the latter being carried by the armature shaft 93 of the motor 94. In operation, the continual oscillation of the plate 85 effects a uniform feed of the adsorbing material into the hopper 56 but at no time permits passage of vapors.

If desired the discharge from the cyclone separator 55, in addition to being connected to the condenser 58 may have a return pipe 112 for conveying vapors to a point adjacent the inlet of the fan 54, as shown at 113. In this manner the vapors are used over and over again and a greater volume of vapors is supplied to the fan so that the velocity in the pipe 53 is sufficient to raise the adsorbing material therewith. It is to be understood that the pipes 53 and 112 are thoroughly lagged.

In refining some liquids it may happen, after the adsorbing material has made many cycles through the apparatus, that its adsorbing efficiency will be decreased because of the deposition of carbonaceous or gummy materials thereon. Where this is liable to occur an auxiliary activator may be employed to drive off these substances from the adsorbing material.

As shown, this auxiliary activator, in the form of a drum 120 is disposed in the furnace 121 which supplies hot gases through the pipe 122 to the main activator 52. The adsorbing material taken from the hopper 56 or other point may be carried through pipe 123 to the inlet end of the activator 120. This pipe may be provided with a valve 124 to control the flow of the adsorbing material therein. At its discharge end the auxiliary activator 120 has a blower 125 discharging through pipe 126 into a cyclone separator 127. The adsorbing material discharged through this pipe 126 is separated from the vapors by the cyclone separator 127 and discharged into the cycle at any suitable point as the worm conveyor 60. The vapors from the top of the cyclone 127 are returned by pipe 128 to the activator 120 at a point adjacent the inlet of the blower 125. In this manner these vapors are used over and over to raise the activated adsorbing material. A small quantity of the vapors may be exhausted through pipe 128' and the loss made up by air supplied through pipe 123' at the inlet end of the auxiliary activator. In this manner oxygen is obtained to burn the carbonaceous deposits associated with the material. It will be understood that the quantity of the adsorbing material supplied to this auxiliary activator may be regulated by valve 124. If desired, all of the adsorbing material from hopper 56 may be passed at intervals through the auxiliary activator 120.

In the specification and claims the term "vapors" as used includes gases as well as vapors.

Although a specific form of the invention has been described in detail, it is to be understood that the invention is not thus limited but includes modifications and changes which come within the scope of the appended claims.

Having thus described my invention what I claim as new and desire to secure by Letters Patent is:

1. The method of reactivating a solid adsorbent material consisting in heating it in the absence of an oxidizing gas and in the presence of a non-oxidizing gas and then burning off combustible substances that may be left on the adsorbent after said heating.

2. The method of reactivating a solid adsorbent consisting in exteriorly heating it in the presence of a non-oxidizing gas and thereafter in the presence of an oxidizing gas.

3. The method according to claim 2 wherein the non-oxidizing gas is steam at moderate temperatures.

4. The method according to claim 2 wherein the oxidizing gas is air.

5. The method of reactivating a solid adsorbent material consisting in distilling the adsorbed substances from the material by means of steam in a non-oxidizing atmosphere and then subjecting it to heating in the presence of an oxidizing gas.

6. The method of reactivating silica gel consisting in subjecting it to two heatings, the first in the absence of an oxidizing gas and in the presence of a non-oxidizing gas and the second in the presence of an oxidizing gas.

7. The method according to claim 6 wherein the second heating is at a higher temperature than the first.

8. The method according to claim 5, wherein the oxidizing gas is air.

9. The method of reactivating a solid adsorbent in a continuous adsorption system, operating in a closed circuit, which consists in treating the adsorbent with an active carrier gas, separating the adsorbent from the carrier gas and returning the latter to the circuit, whereby the carrying power of the gas is increased.

10. The method of reactivating a solid adsorbent in a continuous adsorption system, operating in a closed circuit, which consists in heating the adsorbent in the presence of a carrier gas, separating the adsorbent from the carrier gas and returning the latter to the circuit.

11. The method according to claim 10 wherein the carrier gas is steam, at moderate temperatures.

12. The method of reactivating a solid adsorbent in a continuous adsorption system, operating in a closed circuit, which consists in heating the adsorbent in the presence of a non-oxidizing carrier gas, separating the adsorbent from the carrier gas and returning the latter to the circuit, and subjecting a portion of the separated adsorbent to a second heating at a higher temperature in the presence of an oxidizing gas.

13. The method according to claim 12 wherein the oxidizing gas is air.

14. The method according to claim 12 characterized in that the adsorbent is separated from the oxidizing gas and the latter returned to the circuit.

15. The method of revivifying a solid adsorbent that comprises first subjecting the adsorbent in a retort to the combined action of externally applied heat and internally applied steam and then subjecting the adsorbent to heat in the presence of air.

16. The process of treating spent adsorbent material used in refining mineral oils that comprises subjecting the material to the distilling action of a carrier gas and then heating the material in the presence of air.

17. The process of treating spent adsorbent material used in refining mineral oils that comprises distilling out occluded bituminous matter from said mineral with the aid of steam and then subjecting the material to further heating under oxidizing conditions.

18. The process of treating spent adsorbent material used in decolorizing mineral oils that comprises heating the material in the presence of steam to a temperature sufficient to drive off oil contained in the mass, then heating the mass at increased temperatures to distill out occluded color material and finally heating the mass under oxidizing conditions.

19. The process of treating spent adsorbent material used in refining mineral oils that comprises heating the material in the presence of steam to a temperature sufficient to distill occluded bituminous matter and then subjecting the material to a higher temperature in the presence of air.

20. The process of treating spent adsorbent material used in decolorizing mineral oils that comprises passing a stream of said material through a heating zone wherein it is subjected to the action of steam to distill out occluded material and then continuously passing said stream through another heating zone wherein the material is heated in the presence of air.

21. The method of revivifying a solid adsorbent material consisting in passing steam under substantially non-oxidizing conditions through said material while heating it by radiation, and then passing a heated oxidizing gas through said material.

22. The method of revivifying a solid adsorbent material consisting in passing steam through said material while heating it by indirect heat, and then passing heated air through said material.

In testimony whereof I hereunto affix my signature.

ERNEST B. MILLER.